United States Patent
Littrell (10) Patent No.: US 9,396,462 B2
(45) Date of Patent: Jul. 19, 2016

(54) SYSTEM AND METHOD FOR ROAMING BILLING FOR ELECTRIC VEHICLES

(75) Inventor: Nathan Bowman Littrell, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 445 days.

(21) Appl. No.: 12/341,904

(22) Filed: Dec. 22, 2008

(65) Prior Publication Data
US 2010/0161482 A1 Jun. 24, 2010

(51) Int. Cl.
*G06Q 50/06* (2012.01)
*G06Q 20/10* (2012.01)
*B60L 3/12* (2006.01)
*B60L 11/18* (2006.01)
(Continued)

(52) U.S. Cl.
CPC ............... *G06Q 20/102* (2013.01); *B60L 3/12* (2013.01); *B60L 11/184* (2013.01); *B60L 11/1824* (2013.01); *B60L 11/1842* (2013.01); *B60L 11/1846* (2013.01); *B60L 11/1848* (2013.01); *G06Q 20/4037* (2013.01); *G06Q 50/06* (2013.01); *G07F 15/005* (2013.01); *B60L 2240/72* (2013.01); *B60L 2240/80* (2013.01); *B60L 2250/16* (2013.01); *B60L 2260/52* (2013.01); *B60L 2260/54* (2013.01); *B60L 2260/58* (2013.01); *Y02E 60/721* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01); *Y04S 50/12* (2013.01)

(58) Field of Classification Search
CPC ......... G06Q 50/06; Y02T 90/12; Y02T 10/70
USPC ............................. 705/32, 40, 412; 320/109
See application file for complete search history.

(56) References Cited

U.S. PATENT DOCUMENTS

| | | |
|---|---|---|
| 3,775,593 A | 11/1973 | Gieringer et al. |
| 4,052,655 A | 10/1977 | Vizza |
| 4,090,577 A | 5/1978 | Moore |

(Continued)

FOREIGN PATENT DOCUMENTS

| | | |
|---|---|---|
| CN | 2573304 Y | 9/2003 |
| CN | 200953476 Y | 9/2007 |

(Continued)

OTHER PUBLICATIONS

EP Foreign Search Report for Application No. 09178313.4-2221 dated Jan. 26, 2010.

(Continued)

*Primary Examiner* — Sara C Hamilton
(74) *Attorney, Agent, or Firm* — General Electric Company (57) ABSTRACT

A vehicle charging station for use with a system for transmitting charging power to an electric vehicle is configured to receive a unique identifier from the electric vehicle and determine a preferred electrical charging power provider based on the identifier. Vehicle charging station is further configured to determine an account associated with the preferred provider and with the identifier, deliver a quantity of electrical charging power to the electric vehicle, and meter the quantity of electrical charging power delivered to the electric vehicle.

15 Claims, 3 Drawing Sheets

(51) Int. Cl.
*G06Q 20/40* (2012.01)
*G07F 15/00* (2006.01)

(56) References Cited

U.S. PATENT DOCUMENTS

| | | |
|---|---|---|
| 4,532,418 A | 7/1985 | Meese et al. |
| 4,592,436 A | 6/1986 | Tomei |
| 4,629,874 A | 12/1986 | Pugsley et al. |
| 4,731,575 A | 3/1988 | Sloan |
| 5,072,380 A | 12/1991 | Randelman et al. |
| 5,101,200 A | 3/1992 | Swett |
| 5,146,067 A | 9/1992 | Sloan et al. |
| 5,202,617 A | 4/1993 | Nor |
| 5,247,304 A | 9/1993 | D'Hont |
| 5,266,947 A | 11/1993 | Fujiwara et al. |
| 5,296,746 A | 3/1994 | Burkhardt |
| 5,297,664 A | 3/1994 | Tseng et al. |
| 5,306,999 A | 4/1994 | Hoffman |
| 5,316,101 A | 5/1994 | Gannon |
| 5,327,066 A | 7/1994 | Smith |
| 5,351,052 A | 9/1994 | D'Hont et al. |
| 5,351,187 A | 9/1994 | Hassett |
| 5,414,624 A | 5/1995 | Anthonyson |
| 5,428,363 A | 6/1995 | D'Hont |
| 5,451,755 A | 9/1995 | Duval et al. |
| 5,459,304 A | 10/1995 | Eisenmann |
| 5,461,298 A | 10/1995 | Lara et al. |
| 5,462,439 A | 10/1995 | Keith |
| 5,485,510 A | 1/1996 | Colbert |
| 5,488,376 A | 1/1996 | Hurta et al. |
| 5,491,483 A | 2/1996 | D'Hont |
| 5,512,787 A | 4/1996 | Dederick |
| 5,513,525 A | 5/1996 | Schurmann |
| 5,534,759 A * | 7/1996 | Evans et al. .................. 318/139 |
| 5,548,200 A | 8/1996 | Nor |
| 5,552,789 A | 9/1996 | Schuermann |
| 5,563,491 A | 10/1996 | Tseng |
| 5,573,090 A | 11/1996 | Ross |
| 5,577,109 A | 11/1996 | Stimson et al. |
| 5,583,418 A | 12/1996 | Honda et al. |
| 5,602,919 A | 2/1997 | Hurta et al. |
| 5,604,342 A | 2/1997 | Fujioka |
| 5,605,182 A | 2/1997 | Oberrecht et al. |
| 5,614,808 A | 3/1997 | Konoya et al. |
| 5,640,002 A | 6/1997 | Ruppert et al. |
| 5,675,342 A | 10/1997 | Sharpe |
| 5,684,379 A | 11/1997 | Svedoff |
| 5,692,132 A | 11/1997 | Hogan |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,742,229 A | 4/1998 | Smith |
| 5,745,052 A | 4/1998 | Matsuyama et al. |
| 5,774,882 A | 6/1998 | Keen et al. |
| 5,797,085 A | 8/1998 | Beuk et al. |
| 5,797,133 A | 8/1998 | Jones et al. |
| 5,809,142 A | 9/1998 | Hurta et al. |
| 5,828,738 A | 10/1998 | Spaeth |
| 5,847,537 A | 12/1998 | Parmley, Sr. |
| 5,878,215 A | 3/1999 | Kling et al. |
| 5,887,266 A | 3/1999 | Heinonen et al. |
| 5,905,247 A | 5/1999 | Ilen |
| 5,955,717 A | 9/1999 | Vanstone |
| 5,974,403 A | 10/1999 | Takriti et al. |
| 5,987,140 A | 11/1999 | Rowney et al. |
| 5,991,750 A | 11/1999 | Watson |
| 5,998,963 A | 12/1999 | Aarseth |
| 6,012,049 A | 1/2000 | Kawan |
| 6,064,320 A | 5/2000 | d'Hont et al. |
| 6,073,840 A | 6/2000 | Marion |
| 6,081,205 A | 6/2000 | Williams |
| 6,107,691 A | 8/2000 | Gore et al. |
| 6,109,525 A | 8/2000 | Blomqvist et al. |
| 6,112,152 A | 8/2000 | Tuttle |
| 6,116,505 A | 9/2000 | Withrow |
| 6,157,162 A | 12/2000 | Hayashi et al. |
| 6,285,162 B1 | 9/2001 | Koo |
| 6,317,721 B1 | 11/2001 | Hurta et al. |
| 6,340,935 B1 | 1/2002 | Hall |
| 6,481,622 B2 | 11/2002 | Hjelmvik |
| 6,487,508 B1 | 11/2002 | Suzuki et al. |
| 6,513,015 B2 | 1/2003 | Ogasawara |
| 6,547,133 B1 | 4/2003 | DeVries, Jr. et al. |
| 6,586,668 B2 | 7/2003 | Shugar et al. |
| 6,609,655 B1 | 8/2003 | Harrell |
| 6,614,204 B2 | 9/2003 | Pellegrino et al. |
| 6,656,778 B1 | 12/2003 | Chen et al. |
| 6,673,479 B2 | 1/2004 | McArthur et al. |
| 6,696,925 B1 | 2/2004 | Aiello, Jr. |
| 6,714,844 B1 | 3/2004 | Dauner et al. |
| 6,756,765 B2 * | 6/2004 | Bruning ........................ 320/108 |
| 6,758,291 B1 | 7/2004 | Koch |
| 6,836,737 B2 | 12/2004 | Petite et al. |
| 6,910,439 B2 | 6/2005 | Baba et al. |
| 6,963,186 B2 | 11/2005 | Hobbs |
| 7,081,832 B2 | 7/2006 | Nelson et al. |
| 7,141,321 B2 | 11/2006 | McArthur et al. |
| 7,142,099 B2 | 11/2006 | Ross et al. |
| 7,209,840 B2 | 4/2007 | Petite et al. |
| 7,236,103 B2 | 6/2007 | Pammer et al. |
| 7,239,226 B2 | 7/2007 | Berardi et al. |
| 7,249,112 B2 | 7/2007 | Berardi et al. |
| 7,312,707 B1 | 12/2007 | Bishop et al. |
| 7,338,335 B1 | 3/2008 | Messano |
| 7,411,371 B2 | 8/2008 | Hobbs |
| 7,429,112 B2 | 9/2008 | Metcalfe |
| 7,434,636 B2 | 10/2008 | Sutherland |
| 7,469,541 B1 | 12/2008 | Melton et al. |
| RE41,085 E | 1/2010 | Anthonyson |
| 7,693,609 B2 * | 4/2010 | Kressner et al. ............. 700/291 |
| 7,792,613 B2 | 9/2010 | Kressner et al. |
| 7,885,893 B2 * | 2/2011 | Alexander ....................... 705/40 |
| 8,019,483 B2 * | 9/2011 | Keefe .............................. 700/286 |
| 2001/0026609 A1 | 10/2001 | Weinstein et al. |
| 2002/0052754 A1 | 5/2002 | Joyce et al. |
| 2002/0132144 A1 | 9/2002 | McArthur et al. |
| 2003/0004792 A1 | 1/2003 | Townzen et al. |
| 2003/0105662 A1 | 6/2003 | Koketsu et al. |
| 2003/0120442 A1 | 6/2003 | Pellegrino et al. |
| 2003/0129884 A1 | 7/2003 | Wakamatsu |
| 2003/0146852 A1 | 8/2003 | O'Dell |
| 2003/0209375 A1 | 11/2003 | Suzuki et al. |
| 2004/0079799 A1 | 4/2004 | Symonds et al. |
| 2004/0104814 A1 | 6/2004 | Christensen et al. |
| 2004/0153782 A1 | 8/2004 | Fukui et al. |
| 2004/0200899 A1 | 10/2004 | Jeng et al. |
| 2005/0008132 A1 | 1/2005 | Paschini et al. |
| 2005/0057373 A1 | 3/2005 | Noguchi |
| 2005/0119010 A1 | 6/2005 | Yasukawa |
| 2005/0273505 A1 | 12/2005 | Kim |
| 2006/0012473 A1 | 1/2006 | Bishop et al. |
| 2006/0041513 A1 | 2/2006 | Yuhara et al. |
| 2006/0180647 A1 | 8/2006 | Hansen |
| 2006/0193282 A1 | 8/2006 | Ikawa et al. |
| 2006/0202862 A1 | 9/2006 | Ratnakar |
| 2006/0259447 A1 * | 11/2006 | Kings et al. ................... 705/412 |
| 2007/0094069 A1 | 4/2007 | Berman |
| 2007/0126395 A1 | 6/2007 | Suchar |
| 2007/0255612 A1 | 11/2007 | Baraty |
| 2008/0007202 A1 | 1/2008 | Pryor |
| 2008/0039979 A1 | 2/2008 | Bridges et al. |
| 2008/0039980 A1 * | 2/2008 | Pollack et al. ................ 700/295 |
| 2008/0039989 A1 * | 2/2008 | Pollack et al. .................. 701/22 |
| 2008/0040223 A1 | 2/2008 | Bridges et al. |
| 2008/0040263 A1 | 2/2008 | Pollack et al. |
| 2008/0040295 A1 | 2/2008 | Kaplan et al. |
| 2008/0040296 A1 | 2/2008 | Bridges et al. |
| 2008/0040479 A1 | 2/2008 | Bridge et al. |
| 2008/0052145 A1 | 2/2008 | Kaplan et al. |
| 2008/0067974 A1 | 3/2008 | Zhang et al. |
| 2008/0150284 A1 | 6/2008 | Fein et al. |
| 2008/0150290 A1 | 6/2008 | Fein et al. |
| 2008/0203966 A1 | 8/2008 | Ward |

(56) References Cited

U.S. PATENT DOCUMENTS

| | | | |
|---|---|---|---|
| 2008/0203973 A1 | 8/2008 | Gale et al. | |
| 2008/0228613 A1* | 9/2008 | Alexander | 705/35 |
| 2008/0270227 A1 | 10/2008 | Al Amri | |
| 2008/0281663 A1 | 11/2008 | Hakim et al. | |
| 2009/0062967 A1 | 3/2009 | Kressner et al. | |
| 2009/0062997 A1 | 3/2009 | Iwase et al. | |
| 2009/0091291 A1 | 4/2009 | Woody et al. | |
| 2009/0115371 A1 | 5/2009 | Chawla et al. | |
| 2009/0144150 A1 | 6/2009 | Sakakibara et al. | |
| 2009/0174365 A1 | 7/2009 | Lowenthal et al. | |
| 2009/0177580 A1 | 7/2009 | Lowenthal et al. | |
| 2009/0177595 A1* | 7/2009 | Dunlap et al. | 705/412 |
| 2009/0224869 A1 | 9/2009 | Baker et al. | |
| 2009/0313033 A1 | 12/2009 | Hafner et al. | |
| 2009/0313034 A1* | 12/2009 | Ferro et al. | 705/1 |
| 2009/0313103 A1* | 12/2009 | Ambrosio et al. | 705/14.25 |
| 2009/0313104 A1* | 12/2009 | Hafner et al. | 705/14.25 |
| 2009/0313174 A1 | 12/2009 | Hafner et al. | |
| 2010/0010685 A1 | 1/2010 | Kang | |
| 2010/0045232 A1* | 2/2010 | Chen et al. | 320/109 |
| 2010/0049396 A1 | 2/2010 | Ferro et al. | |
| 2010/0049610 A1 | 2/2010 | Ambrosio et al. | |
| 2010/0049639 A1 | 2/2010 | Ferro et al. | |
| 2010/0049737 A1 | 2/2010 | Ambrosio et al. | |
| 2010/0065627 A1* | 3/2010 | Outwater | 235/381 |
| 2010/0079004 A1* | 4/2010 | Keefe | 307/80 |
| 2010/0082464 A1* | 4/2010 | Keefe | 705/32 |
| 2010/0141203 A1* | 6/2010 | Graziano et al. | 320/109 |
| 2010/0145837 A1* | 6/2010 | Graziano et al. | 705/34 |
| 2010/0145885 A1* | 6/2010 | Graziano et al. | 705/412 |
| 2011/0153131 A1* | 6/2011 | Kressner et al. | 701/22 |
| 2011/0153474 A1* | 6/2011 | Tormey et al. | 705/31 |

FOREIGN PATENT DOCUMENTS

| | | |
|---|---|---|
| CN | 101076190 A | 11/2007 |
| CN | 101082959 A | 12/2007 |
| DE | 10304284 A1 | 8/2004 |
| EP | 0479290 A2 | 4/1992 |
| EP | 1205340 A1 | 5/2002 |
| EP | 1588930 A1 | 10/2005 |
| EP | 1862986 A1 | 5/2007 |
| GB | 2430529 A | 3/2007 |
| GB | 2438979 A | 12/2007 |
| JP | 05256038 A | 5/1993 |
| JP | 2010-512727 | 2/2000 |
| JP | 2002150337 A | 5/2002 |
| JP | 2006215779 A | 8/2006 |
| JP | 2008-065635 A | 3/2008 |
| JP | 2000-045869 A | 4/2010 |
| WO | 02063742 A1 | 8/2002 |
| WO | 2007141543 A2 | 12/2007 |
| WO | 2008073453 A1 | 6/2008 |
| WO | 2008107767 A2 | 9/2008 |

OTHER PUBLICATIONS

European Patent Office, Search Report for European Patent Application No. 09178452.0-2207, dated Mar. 23, 2010, 4 pages.

Rich Housh & Kathy Ellington, "Plug-in Hybrid Electric Vehicle Smart Charging," available at http://www.eei.org/meetings/Meeting%20Documents/2009-04-05-Mon-Ellington.pdf (last visited Jul. 23, 2009).

European Patent Office Search Report, EP09178316, Application No./Patent No. 09178316.7-2221, Feb. 12, 2010, 7 pages.

PCT, International Search Report for International Patent Application No. PCT/US2009/065229, dated Feb. 25, 2010, 4 pages.

The Associated Press, Hawaii to be First with Electric Car Stations, Dec. 3, 2008, 2 pages, MSNBC.com.

IBM Technical Disclosure, Green Car Versatile Plug, IPCOM000177564D, Dec. 18, 2008.

Unofficial translation of Japanese Office Action for Japanese Application No. 2011-542190 dated Oct. 8, 2013.

Unofficial translation of Chinese Office Action for Chinese Application No. 200980152855.3 dated Sep. 16, 2013.

Unofficial translation of Chinese Office Action for Chinese Application No. 200980152855.3 dated Sep. 5, 2013.

Chinese Search Report for Application 200980152817.8 dated Dec. 11, 2012.

Chinese Office Action for Application 200980152817.8 dated Dec. 26, 2012.

Chinese Office Action for Application 200980152855.3 dated Jan. 14, 2013.

Chinese Search Report for Application 200980152855.3 dated Dec. 20, 2012.

Radio Frequency Identification Tag Application for Tracking Vehicle Refueling, Maintenance, and Theft, XP000694521, IBM Technical Disclosure Bulletin, Mar. 1997, pp. 81-82, vol. 40, No. 03.

Green Car Versatile Plug, ip.com Prior Art Database, http://www.ip.com/pubview///IPCOM000177564D, IBM, Dec. 18, 2008, 4 pages.

C.M. Roberts, Radio Frequency Identification (RFID), Department of Information Sciences, Otago University, New Zealand, Science Direct, Computers & Security, 2006, pp. 18-26, vol. 25, Elsevier Ltd.

Patent Cooperation Treaty, PCT/US2009/065356, Notification of Transmittal of the International Search Report and the Written Opinion of the International Searching Authority, or the Declaration, Mar. 31, 2010, 14 pages.

Patent Cooperation Treaty, PCT/US2009/066930, Notification of Transmittal of the International Search Report and the Written Opinion of the International Searching Authority, or the Declaration, Jun. 25, 2010, 10 pages.

* cited by examiner

SYSTEM AND METHOD FOR ROAMING BILLING FOR ELECTRIC VEHICLES

BACKGROUND OF THE INVENTION

The subject matter disclosed herein relates generally to the charging of a mobile electric load and more specifically, to systems and methods for use in billing a customer for charging an electric vehicle at locations within and without the customer's local electric utility area.

As electric vehicles and hybrid electric vehicles gain popularity, an associated need to accurately manage delivery of electrical charging power to them has increased. Moreover, a need to recognize revenue due to the electricity supplier is created by the increased use of such vehicles.

At least some known transaction systems facilitate identifying a vehicle during a transaction via wireless communications such as RFID and remote transmitters. For example, at least some of such systems read a prepaid RFID card carried within a vehicle to collect expressway tolls while the vehicle moves within a predetermined range of speed through a toll booth. The vehicle is identified based on the RFID card and a toll amount is automatically deducted from an existing account.

Moreover, at least some known communications systems enable the distribution of data, such as operating data, between a vehicle on-board computer and transponders located either within the vehicle or remotely from the vehicle. For example, transponders within the vehicle may communicate vehicular operating conditions to the on-board computer. Moreover, transponders remote to the vehicle may communicate toll booth information, service information, parking costs, and/or road conditions to the on-board computer. Furthermore, at least some known transaction systems enable transaction information to be communicated between a vehicle-mounted interface and a remote transaction unit. For example, transaction information may be communicated between the vehicle-mounted interface system and a bank teller unit used to withdraw and /or deposit funds to an account. Moreover, transaction information may be communicated between the vehicle-mounted interface system and a drive-through point-of-sale system used to purchase goods and/or services.

In addition, at least some known electricity delivery systems provide electric metering at a customer's premises. For example, some delivery systems use an encoded magnetic strip applied to a card to transfer purchase information between a utility billing office and a utility metering and control device located at the customer's premises. A credit meter stored within the control device deducts a value associated with a quantity of electricity consumed at the customer's premises. Some of such systems also enable the use of an emergency card that includes a similar encoded magnetic strip when the customer's account with the pre-purchased quantity is exhausted. However, generally such systems do not meter electrical charging power delivered to a specific electric load, and are thus not compatible for use with electric vehicles.

Furthermore, at least some known systems enable roaming capabilities for use of mobile communications systems. More specifically, a communication device, such as a mobile phone, is configured for a network operated by a specific operator, and when the mobile phone is used outside of that network the outside provider bills the specific operator for its customer's usage and the specific operator would then bill its customer for the roaming usage, usually including an additional fee for the benefit of roaming. Such systems are intended for roaming of a mobile phone for communications purposes.

None of the above-described communication and/or transaction systems enable an electric vehicle charging station to obtain a unique identifier of an electric vehicle for use in a transaction that includes delivering electrical charging power to the electric vehicle even when the electric vehicle is outside of the area operated by its preferred provider. Accordingly, systems and methods that facilitate identifying an electric vehicle, and its preferred provider, prior to delivering electrical charging power and/or recognizing revenue from the delivery of electrical charging power to electric vehicles is desirable.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a vehicle charging station for use with a system for transmitting charging power to an electric vehicle is configured to communicatively couple to the electric vehicle, electrically couple to the electric vehicle via a connector, receive a unique identifier from the electric vehicle, and determine a preferred electrical charging power provider based on the identifier. Vehicle charging station is further configured to determine an account associated with the preferred provider and with the identifier, deliver a quantity of electrical charging power to the electric vehicle via the connector, and meter the quantity of electrical charging power delivered to the electric vehicle.

In another aspect, a vehicle charging system for use in charging an electric vehicle includes a vehicle charging station configured to communicatively couple to the electric vehicle, electrically couple to the electric vehicle via a connector, receive a unique identifier from the electric vehicle, deliver a quantity of electrical charging power to the electric vehicle via the connector, and meter the quantity of electrical charging power delivered to the electric vehicle. The system further includes a server system coupled to the vehicle charging station, wherein the server system is configured to determine a preferred electrical charging power provider based on the identifier, determine an account associated with the preferred provider and with the identifier, and determine a transaction amount based on the quantity of electrical charging power delivered to the electric vehicle by the vehicle charging station.

In yet another aspect, a method for charging an electric vehicle includes communicatively coupling a vehicle charging station to the electric vehicle, electrically coupling the vehicle charging station to the electric vehicle via a connector, receiving a unique identifier from the electric vehicle, and determining a preferred electrical charging power provider for the electric vehicle based on the identifier. The method further includes determining an account associated with the preferred provider and the identifier, delivering a quantity of electrical charging power to the electric vehicle via the connector, and determining a transaction amount based on the quantity of electrical charging power delivered to the electric vehicle at the vehicle charging station.

BRIEF DESCRIPTION OF THE DRAWINGS

The embodiments described herein may be better understood by referring to the following description in conjunction with the accompanying drawings.

DETAILED DESCRIPTION OF THE INVENTION

In some embodiments, the term "electric vehicle" refers generally to any vehicle that includes one or more electric motors that are used for propulsion, such as an all-electric vehicle that uses only electricity, and/or a plug-in hybrid-electric vehicle that uses a gas powered engine in combination with batteries charged by an external power source or an engine and generator, to propel the vehicle. In addition, the term "electric vehicle" includes any suitable vehicle known to those skilled in the art and guided by the teachings herein provided that is capable of performing the functions described herein.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may also include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Although described in connection with an exemplary energy delivery system environment, embodiments of the invention are operational with numerous other general purpose or special purpose computing system environments or configurations. The energy delivery system environment is not intended to suggest any limitation as to the scope of use or functionality of any aspect of the invention. Moreover, the energy delivery system environment should not be interpreted as having any dependency or requirement relating to any one or combination of components illustrated in the exemplary operating environment. Examples of well known systems, environments, and/or configurations that may be suitable for use with aspects of the invention include, but are not limited to, personal computers, server computers, hand-held or laptop devices, multiprocessor systems, microprocessor based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more controllers, computers, or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

Technical effects of the methods, systems, and vehicle charging station herein include at least one of communicatively coupling a vehicle charging station to the electric vehicle, electrically coupling the vehicle charging station to the electric vehicle via a connector, receiving a unique identifier from the electric vehicle, determining a preferred electrical charging power provider, determining an account associated with the preferred provider and the identifier, determining whether to approve or deny service to the electric vehicle, delivering a quantity of electrical charging power to the electric vehicle via the connector, metering the quantity of electrical charging power delivered, determining a transaction amount based on the quantity of delivered electrical charging power, and deducting the transaction amount from the account.

Figure 1:
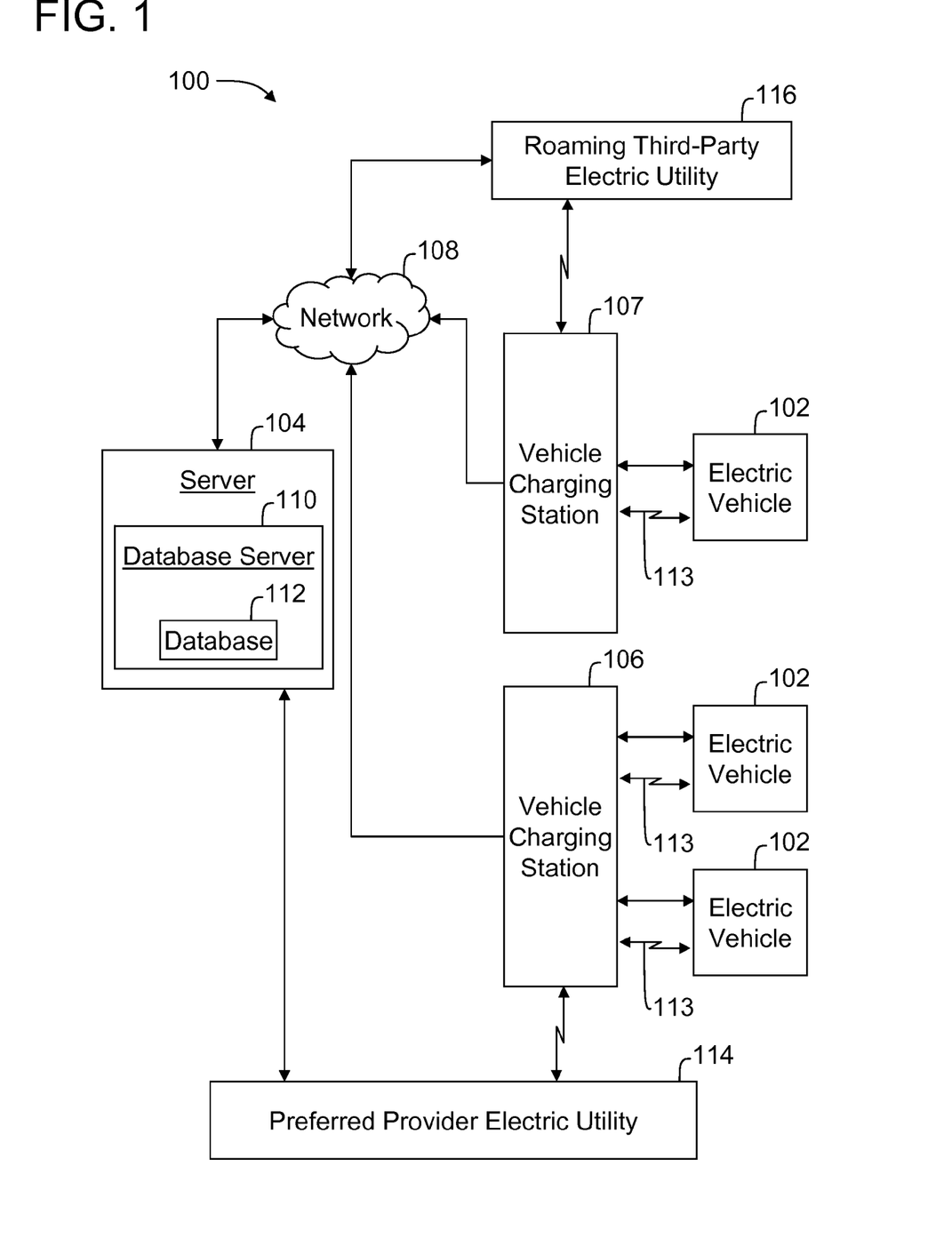
FIG. 1 is a simplified block diagram of an exemplary electricity delivery system for use with a roaming electric vehicle.

FIG. 1 is a simplified block diagram of an exemplary electricity delivery system 100 for use with a roaming electric vehicle 102. In the exemplary embodiment, system 100 includes a server system 104, a vehicle charging station 106 that is coupled to server system 104, and a vehicle charging station 107 used when electric vehicle 102 is roaming outside of its preferred service area. As shown in FIG. 1, server system 104 may be coupled to a plurality of vehicle charging stations 106 and 107. In one embodiment, vehicle charging station 106 is coupled to a network 108 that enables vehicle charging station 106 to access server system 104 over network 108. In one embodiment, network 108 includes a private network such as a wide area network. In another embodiment, network 108 includes a public network, such as the Internet. Vehicle charging stations 106 and 108 may be connected to network 108 through many interfaces such as a local area network (LAN), a wide area network (WAN), dial-in-connections, cable modems, wireless modems, and/or special high-speed Integrated Services Digital Network (ISDN) lines. A database server 110 includes a database 112 that contains information on a variety of matters, such as account information related to electric vehicle power distribution. In the exemplary embodiment, centralized database 112 is stored in server system 104 and is accessed via at least one vehicle charging station 106. In an alternative embodiment, database 112 is stored remotely from server system 104 and may be non-centralized. Moreover, in the exemplary embodiment, each of a plurality of vehicle charging stations 106 and 107 is capable of providing electrical charging power to at least one electric vehicle 102 via at least one connector 113. Each electric vehicle 102 stores the electrical charging power and uses the stored power for propulsion, rather than, or in addition to, more conventional energy sources such as gasoline.

As described in more detail below, in the exemplary embodiment, vehicle charging stations 106 and 107 are configured to communicatively couple to the electric vehicle and electrically couple to the electric vehicle via connector 113 for delivery of electrical charging power. Each electric vehicle 102 includes a unique identifier that is received by one of vehicle charging stations 106 and 107 and used by one of vehicle charging stations 106 and 107 and/or server system 104 to identify electric vehicle 102, a preferred electrical charging power provider 114 for electric vehicle 102, and/or an account associated with electric vehicle 102. For example, in one embodiment, database 112 may include transactional and/or accounting data related to prepayment information associated with a quantity of electrical charging power that has been paid for in advance for later distribution to electric vehicle 102. Moreover, database 112 may include historical electrical charging power distribution data, such as transaction dates, and/or a quantity of electrical charging power delivered to electric vehicle 102 for each transaction. Further, database 112 may include historical payment information, such as prepayment dates and/or prepayment amounts.

In the exemplary embodiment, database 112 includes data related to one or more of preferred electrical charging power provider 114 and at least one roaming third-party electrical charging power provider 116. More specifically, in the exemplary embodiment, when at least one electric vehicle 102 roams outside of an area serviced by preferred provider 114, vehicle charging station 107 coupled to roaming third-party provider 116 transmits the unique identifier to roaming third-party provider 116 to determine preferred provider 114. Roaming third-party provider 116 then transmits the unique identifier to server system 104 at preferred provider 114 to determine an account associated with preferred provider 114 and the unique identifier using a database search. Vehicle charging station 107 determines a present balance of the account and denies access to electrical charging power if the present balance of the account is less than a predetermined balance. Further, vehicle charging station 107 may provide service to electric vehicle 102 by delivering a quantity of electrical charging power to electric vehicle 102. Vehicle charging station 107 also meters a quantity of electrical charging power delivered to electric vehicle 102 and transmits the metered quantity to roaming third-party provider 116 to determine a transaction amount based on a rate for electrical charging power from roaming third-party provider 116. In the exemplary embodiment, vehicle charging station 107 coupled to roaming third-party provider 116 then transmits the transaction amount to server system 104 at preferred provider 114, and server system 104 deducts the transaction amount from the account and transfers the transaction amount from preferred provider 114 to roaming third-party provider 116. As used herein, the term "balance" includes any amount of money available in an account for use in paying for electrical charging power, such as an amount of cash on deposit in an account and an amount of credit available on an account, including a credit card and line of credit.

The embodiments illustrated and described herein as well as embodiments not specifically described herein, but within the scope of aspects of the invention, constitute exemplary means for identifying an electric vehicle requesting service from at least one of preferred provider 114 and/or roaming third-party provider 116. For example, when electric vehicle 102 is within the service area for preferred provider 114, vehicle charging station 106 determines an account and present balance via server system 104, and the transaction amount is based upon a rate for electrical charging power from preferred provider 114. Alternatively, when electric vehicle 102 is outside the service area for preferred provider 114 and in the service area for roaming third-party provider 116, the account and present balance are determined via roaming third-party provider 116 to enable vehicle charging station 107 to provide service to electric vehicle 102 and submit a metered transaction amount to preferred provider 114 for payment and/or billing to user/customer. For example, server system 104, vehicle charging station 106, vehicle charging station 107, and/or any other similar computer device that is programmed with computer-executable instructions as illustrated in FIG. 1, provides exemplary means for identifying an electric vehicle 102 and an associated account based on the unique identifier and the preferred provider 114.

Figure 2:
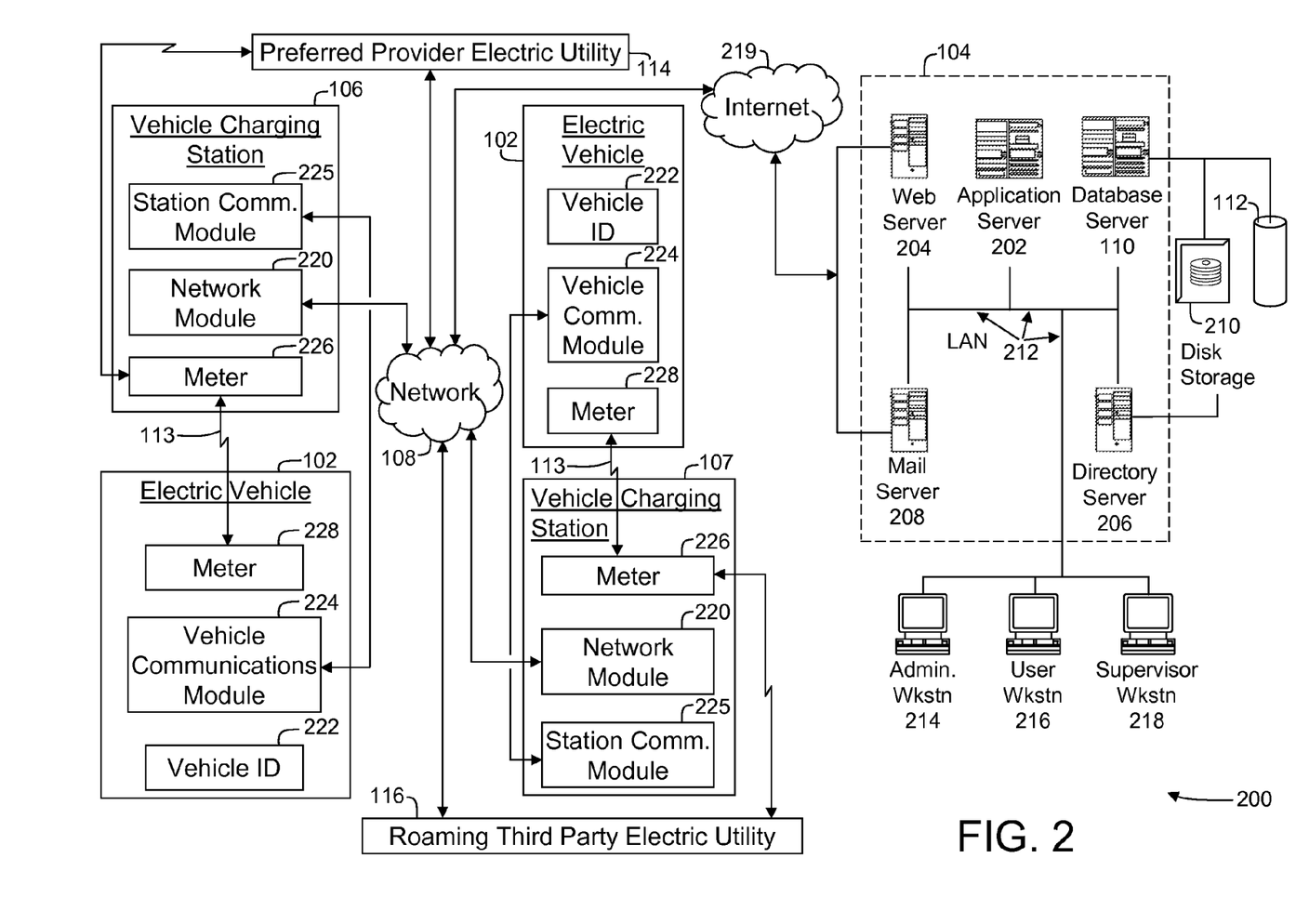
FIG. 2 is an expanded block diagram of an exemplary embodiment of a system architecture of the system shown in FIG. 1.

FIG. 2 is an expanded block diagram of an exemplary system architecture 200 of system 100 (shown in FIG. 1). Components in system architecture 200 that are identical to components of system 100 are identified in FIG. 2 using the same reference numerals used in FIG. 1. In the exemplary embodiment, system 200 includes server system 104, vehicle charging station 106, and vehicle charging station 107. Server system 104 also includes database server 110, an application server 202, a web server 204, a directory server 206, and a mail server 208. A disk storage unit 210 is coupled to database server 110 and to directory server 206. Disk storage unit 210 may include, but is not limited to only including, a Network Attached Storage (NAS) device and/or a Storage Area Network (SAN) device. In one embodiment, database 112 is stored in database server 110. In the exemplary embodiment, database 112 is coupled to database server 110 and disk storage 210. Servers 110, 202, 204, 206, and 208 are coupled in a local area network (LAN) 212. Moreover, a system administrator workstation 214, a user workstation 216, and a supervisor workstation 218 may be coupled to LAN 212 to enable communication with server system 104.

Alternatively, workstations 214, 216, and 218 may be coupled to LAN 212 using a link to an Internet 219, or alternatively, may be coupled through network 108 that may include a private network. In one embodiment, an owner or user of electric vehicle 102 may access server system 104 via web server 204 to access, for example, the user's account and/or a payment service that enables the user to pay for electrical charging power that has been delivered to electric vehicle 102 via the connector 113 or will be delivered to electric vehicle 102. Moreover, in one embodiment, mail server 208 may be configured to send a message, such as an email message, to the user when the user's account balance falls below a predetermined balance. Alternatively, a user may setup a periodic reminder, wherein mail server 208 transmits a message to the user at a configurable periodic rate or when the account balance reaches a predetermined balance as a reminder to prepay for electrical charging power to be delivered later to electric vehicle 102. Vehicle charging stations 106 includes a network module 220 used to communicate with server system 104, and vehicle charging station 107 includes network module 220 used to communicate with roaming third-party provider 116. The systems and processes, are not limited to being practiced using a WAN type communication method or Internet 219.

To facilitate communication between electric vehicle 102 and one of vehicle charging stations 106 and 107, electric vehicle 102 includes a unique vehicle identifier 222. In the exemplary embodiment, identifier 222 is a number generated by server system 104 upon creation of the user's account. In one embodiment, unique vehicle identifier 222 includes a manufacturer provided vehicle identification number (VIN) of electric vehicle 102. In other embodiments, identifier 222 can be one or more of an electrical charging power supplier account number, a pre-paid stored value account number, a credit account number, or any suitable identifying number of a type known to those skilled in the art and guided by the teachings herein provided that is capable of being used as described herein. In one embodiment, unique vehicle identifier 222 is accessible only upon authorization by the user of electric vehicle 102, as to restrict unauthorized access to unique vehicle identifier 222. In another embodiment, a new unique vehicle identifier 222 is generated after completion of one or more transactions for the delivery of electrical charging power, and identifier 222 is stored in electric vehicle 102 and server system 104 for a subsequent transaction. Electric vehicle 102 also includes a vehicle communications module 224 for use in communicatively coupling electric vehicle to one of vehicle charging stations 106 and 107 via station communication module 225.

In the exemplary embodiment, identifier 222 is linked in database 112 to an account associated with electric vehicle 102. An account balance is maintained within database 112 including prepayments made to the account by the account owner. Alternatively, identifier 222 may be linked to an account associated with a person, such that an account balance may be allocated among one or more electric vehicles 102. Further, in the exemplary embodiment, vehicle charging stations 106 and 107 each include a station meter 226 that tracks a quantity of electrical charging power delivered to electric vehicle 102. Moreover, in the exemplary embodiment, electric vehicle 102 includes a vehicle meter 228 that tracks a quantity of electrical charging power received by electric vehicle 102.

During use, when a customer desires to charge electric vehicle 102, electric vehicle 102 is communicatively coupled to one of vehicle charging stations 106 and 107 via vehicle communication module 224 and station communication module 225. More specifically, in one embodiment, if electric vehicle 102 is in an area serviced by preferred provider 114, then vehicle charging station 106 transmits identifier 222 to server system 104, and server system 104 determines an account and account balance associated with identifier 222. In another embodiment, if electric vehicle 102 is roaming in an area that is not serviced by preferred provider 114, then vehicle charging station 107 transmits identifier 222 to roaming third-party provider 116 that provide service to an area in which vehicle charging station 107 is located. Roaming third-party provider 116 determines preferred provider 114 for electric vehicle 102 and transmits identifier 222 to server system 104 operated by preferred provider 114. Server system 104 determines an account and account balanced associated with identifier 222.

Moreover, in one embodiment, to determine whether electric vehicle 102 is in an area serviced by preferred provider 114, electric car 102 may transmit a location of electric vehicle 102 to one of vehicle charging stations 106 and 107. In such an embodiment, electric vehicle 102 may obtain the location via one of a Global Positioning Satellite (GPS) receiver (not shown), a wireless mobile communications provider device (not shown), from vehicle charging stations 106 and 107, via inference through a known location of vehicle charging stations 106 and 107, or from any means known to those skilled in the art that is capable of performing the functions described herein. Moreover, in such an embodiment, server system 104 may use the location information to determine a different rate per unit of electrical charging power for service to electric vehicle 102. Further, in such an embodiment, server system 104 may also use the location information to determine an availability of electrical charging power to one of vehicle charging stations 106 and 107, and based on such a determination, electric vehicle 102 may be denied service, or service may be delayed for a period of time, as to avoid, for example, peak charging times, a per unit cost higher than desired by the user or the owner of electric vehicle, or an electricity shortage.

In another embodiment, server system 104 also communicates via vehicle charging stations 106 and 107, and/or roaming third-party provider 116 to request the delay of service to avoid, for example, peak charging times, a per unit cost higher than desired by the user or the owner of electric vehicle 102, and/or an electricity shortage. Further, in one embodiment, one of vehicle charging stations 106 and 107 is coupled to at least one visual display (not shown), that is attached to at least one of electric vehicle 102 and vehicle charging stations 106 and 107 to output to at least one display at least one of a quantity of electrical charging power delivered, a monetary value of the quantity of electrical charging power delivered, and a quantity of electrical charging power remaining to be delivered.

In the exemplary embodiment, if the account balance meets a predetermined balance, one of vehicle charging stations 106 and 107 is instructed to enable service to electric vehicle 102. Moreover, if the account balance does not meet the predetermined balance, service to electric vehicle 102 is denied and a message is displayed to the user/customer stating the reason for the denial. Further, server system 104 may issue a temporary credit to the account balance to meet the predetermined balance. In one embodiment, one of vehicle charging stations 106 and 107 meters electrical charging power delivery to electric vehicle 102 using a different rate per unit of electrical charging power, such as a higher rate, when a temporary credit is issued. In another embodiment, server system 104 may instruct one of vehicle charging stations 106 and 107 to deny service to electric vehicle 102 when the account associated with identifier 222 has been put into a hold state. In such an embodiment, a "hold" state may be placed on the account based on, for example, a delinquent payment by the customer and/or a report of electric vehicle 102 being stolen.

In the exemplary embodiment, when service to electric vehicle 102 is enabled, one of vehicle charging stations 106 and 107 delivers a quantity of electrical charging power to electric vehicle 102. During delivery, one of vehicle charging stations 106 and 107, via station meter 226, and electric vehicle 102, via vehicle meter 228, each meter the quantity of electrical charging power delivered. If electric vehicle 102 is within the area serviced by preferred provider 114, then vehicle charging station 106 transmits the measured quantity to server system 104 to determine a transactional amount and server system 104 deducts the transaction amount from the account. Alternatively, when electric vehicle 102 is roaming, vehicle charging station 107 transmits the measured quantity to roaming third-party provider 116 to determine a transactional amount. Roaming third-party provider 116 transmits the transaction amount to server system 104 at preferred provider 114 and server system 104 deducts the transaction amount from the account. Server system 104 then transfers the transaction amount from preferred provider 114 to roaming third-party provider 116. If the final transaction amount is greater than the account balance, server system 104 may issue a temporary credit using a different rate, such as a higher rate, as described above, and may charge a fee for issuing the temporary credit. In addition, in one embodiment, upon the conclusion of the delivery of the electrical charging power, station meter 226 and vehicle meter 228 compare the quantity of electrical charging power delivered and/or the final transaction amount. If the comparison results in a match, then vehicle meter 228 generates a receipt. In one embodiment, the receipt is stored in vehicle meter 228. In another embodiment, the receipt is also transmitted to one of vehicle charging stations 106 and 107 for storage in server system 104 or by roaming third-party provider 116. This comparison facilitates enabling accuracy of the metered quantity of electrical charging power delivered and/or ensuring that the correct transaction amount is billed to the account and/or deducted from the account balance. Moreover, the comparison facilitates ensuring that, if there are multiple electric vehicles 102 receiving electrical charging power from one of vehicle charging stations 106 and 107, the correct account is billed.

Figure 3:
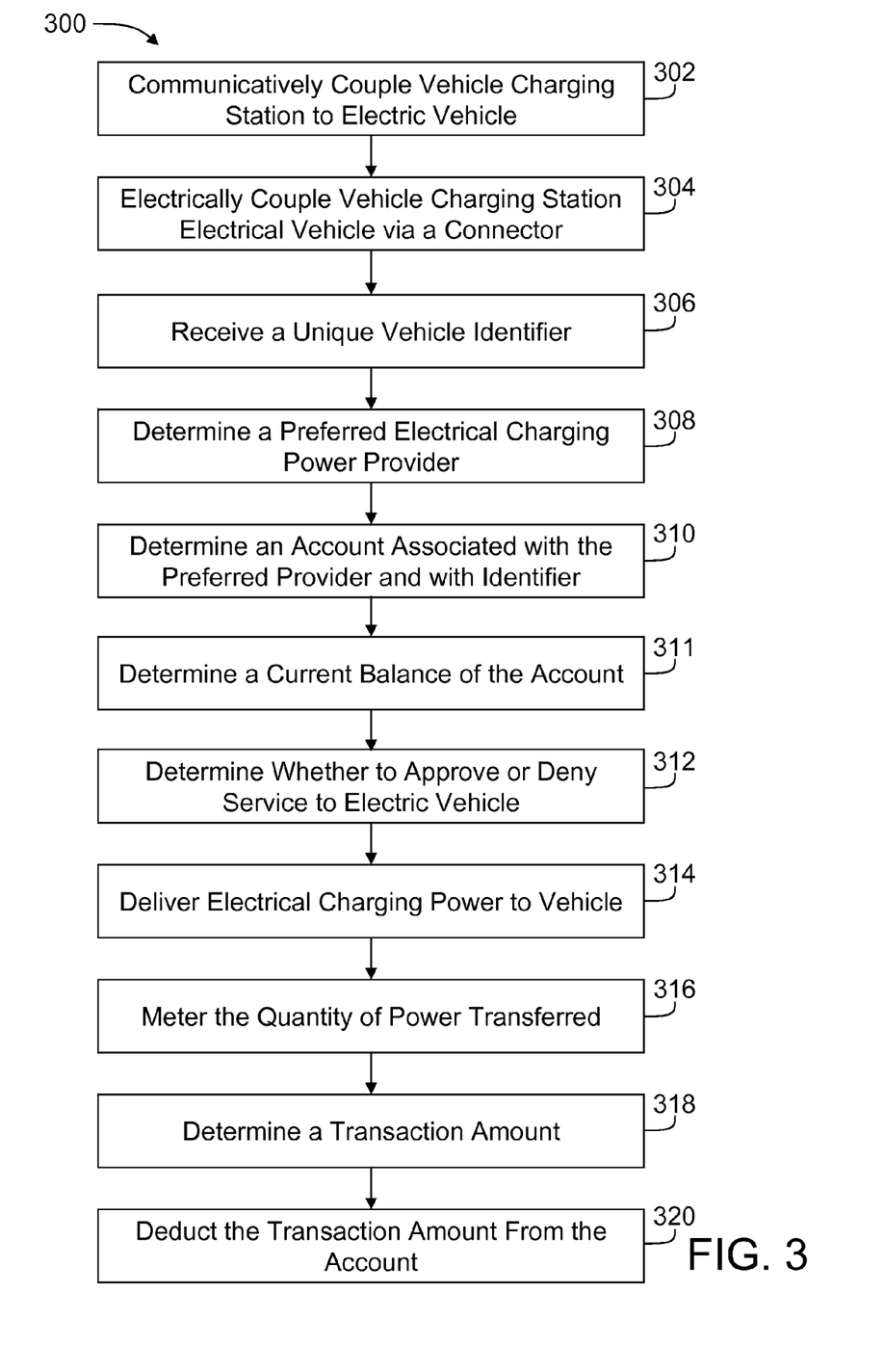
FIG. 3 is a flowchart illustrating an exemplary method for use in delivering electrical charging power to a roaming electric vehicle using the system shown in FIGS. 1 and 2.

FIG. 3 is a flowchart 300 illustrating an exemplary method for use in delivering electrical charging power to electric vehicle 102 (shown in FIGS. 1 and 2), using the system shown in FIGS. 1 and 2. In the exemplary embodiment, vehicle charging stations 106 and 107 (shown in FIGS. 1 and 2) are communicatively coupled 302 to electric vehicle 102, and vehicle charging stations 106 and 107 are electrically coupled 304 to electric vehicle via connector 113 (shown in FIGS. 1 and 2). Further, in the exemplary embodiment, server system 104 (shown in FIGS. 1 and 2) receives 306 unique vehicle identifier 222 (shown in FIG. 2) from electric vehicle 102. In the exemplary embodiment, electric vehicle 102 and, more specifically, identifier 222, are associated with preferred provider 114 (shown in FIGS. 1 and 2) and a customer account. Server system 104 and/or roaming third-party provider 116 (shown in FIGS. 1 and 2) determines 308 a preferred electrical charging power provider 114. If electric vehicle 102 is not in an area serviced by preferred provider 114, then roaming third-party provider 116 transmits identifier to server system 104 at preferred provider 114. Server system 104 then determines 310 an account associated with preferred provider 114 and identifier 222. More specifically, server system 104 determines the user account associated with identifier 222 within database 108 (shown in FIGS. 1 and 2). In the exemplary embodiment, server system 104 then determines 311 a current balance of the customer account.

In the exemplary embodiment, server system 104 determines 312 whether to approve or to deny service to electric vehicle 102 and, if electric vehicle 102 is located within the area serviced by preferred provider 114, server system 104 transmits the determination to vehicle charging station 106. If electric vehicle 102 is located within the area serviced by roaming third-party provider 116, then server system 104 transmits the determination to roaming third-party provider 116. Roaming third-party provider 116 then transmits the determination to vehicle charging station 107. In the exemplary embodiment, if the current balance is less than a predetermined balance, the customer is denied service at one of vehicle charging stations 106 and 107. Further, in the exemplary embodiment, the customer may be prompted to insert a credit card or cash into a payment acceptance device (not shown) coupled to one of vehicle charging stations 106 and 107. In one embodiment, service may be denied by server system 104 if a stolen car report associated with electric vehicle 102 exists. In the exemplary embodiment, the current account balance may be increased by the account holder remotely using, for example, user workstation 216 (shown in FIG. 2). For example, in one embodiment, the customer may login to server system 104 via user workstation 216 in order to access a payment program that enables the customer to designate a payment amount to be applied to the account balance. In such an embodiment, the customer also designates a payment source including, but not limited to, a credit card, a debit card, and/or a banking account. The payment amount, in such an embodiment, is then credited to the account balance.

In the exemplary embodiment, a quantity of electrical charging power is delivered 314 to electric vehicle 102 via one of vehicle charging stations 106 and 107, and the quantity of electrical charging power delivered is metered 316. A transaction amount is determined 318 based on an actual quantity of electrical charging power delivered to electric vehicle 102. More specifically, station meter 226 (shown in FIG. 2) meters the quantity of electrical charging power delivered. In one embodiment, vehicle charging station 106 determines a transaction amount based on the quantity of electrical charging power delivered and transmits the transaction amount to server system 104. In another embodiment, vehicle charging station 107 determines 318 the transaction amount based on the quantity of electrical charging power delivered 314 and transmits the transaction amount to roaming third-party provider 116, which then transmits to server system 104. In one embodiment, vehicle charging station 106 transmits to server system 104 the quantity of electrical charging power delivered to electric vehicle 102, and server system 104 determines the transaction amount based on the quantity of electrical charging power delivered. In another embodiment, vehicle charging station 107 transmits to roaming third-party provider 116, which then transmits to server system 104, the quantity of electrical charging power delivered to electric vehicle 102, and server system 104 determines the transaction amount based on the quantity of electrical charging power delivered.

In the exemplary embodiment, the transaction amount is then compared to the current balance in the customer account. If the transaction amount is less than the current balance, the transaction amount is deducted 320 from the current balance and the new balance is then stored in database 112. In one embodiment, the new balance is transmitted by server system 104 to vehicle charging station 106 and displayed to the user/customer via at least one visual display (not shown). In another embodiment, the new balance is transmitted to roaming third-party provider 116 which then transmits the new balance to vehicle charging station 107 which displays the new balance to the user/customer via at least one visual display (not shown). In an alternative embodiment, the new balance is also transmitted to electric vehicle 102 and is displayed to the user or the customer via vehicle meter 228 (shown in FIG. 2). If the current balance is less than the transaction amount, the customer account may be credited with the difference between the transaction amount and the current balance, and the customer may be billed for the difference at a later time. In such an embodiment, the billing rate may be changed for any electrical charging power distributed on credit. Alternatively, the customer may be prompted to submit payment to one of vehicle charging stations 106 and 107 by, for example, the customer being prompted to insert a credit card into the payment acceptance device (not shown) coupled to one of vehicle charging stations 106 and 107. In the exemplary embodiment, a confirmation of the receipt of the delivered electrical charging power is generated by vehicle meter 228. The receipt may be used by the customer to verify a quantity of electrical charging power delivered and/or a cost per unit of electrical charging power. The receipt may be generated by electric vehicle 102 and stored in electric vehicle 102 and database 112. Alternatively, the receipt may be generated by server system 104, stored in database 112, and transmitted to electric vehicle 102 via one of vehicle charging stations 106 and 107. In addition, in one embodiment, an adjusted current balance may be displayed to the customer via at least one visual display coupled to at least one of electric vehicle 102 and vehicle charging stations 106 and 107 to reflect a deduction of the transaction amount from the account.

Described in detail herein are exemplary embodiments of methods, systems, and computers that facilitate delivering electrical charging power to vehicles, such as electric vehicles. More specifically, the embodiments described herein facilitate identifying an electric vehicle at a vehicle charging station using a unique identifier embedded within the electric vehicle and determining whether the electric vehicle has roamed into a non-preferred service area. Identifying an electric vehicle and determining whether it has roamed facilitates automatic deduction of a transaction amount from an account. Such an automatic deduction facilitates time savings for a customer and greater ease in collecting revenue for an electric distribution utility.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

While the invention has been described in terms of various specific embodiments, those skilled in the art will recognize that the invention can be practiced with modification within the spirit and scope of the claims.

What is claimed is:

1. A vehicle charging station for use with a system for transmitting charging power to an electric vehicle, said vehicle charging station configured to:
   communicatively couple to the electric vehicle;
   electrically couple to the electric vehicle via a connector;
   receive a unique identifier from the electric vehicle, wherein the unique identifier is associated with a preferred provider;
   transmit the unique identifier to a server;
   receive, from the server, a determination of the preferred provider associated with the unique identifier;
   receive, from the server, a determination of an account associated with the unique identifier;
   determine a present balance of the account based on the unique identifier;
   deliver a quantity of electrical charging power to the electric vehicle via the connector from a roaming third party provider that is different than the preferred provider when the determined present balance of the account meets or exceeds a predetermined amount;
   when the determined present balance of the account does not meet the predetermined amount:
      deny access to electrical charging power;
      increase the determined present balance of the account to meet the predetermined amount; and
      deliver the quantity of electrical charging power to the electric vehicle via the connector from the roaming third party provider that is different than the preferred provider; and
   meter the quantity of electrical charging power delivered to the electric vehicle.

2. A vehicle charging station in accordance with claim 1, wherein said vehicle charging station is further configured to transmit, to the preferred provider, the quantity of electrical charging power delivered to the electric vehicle and receive, from the preferred provider, a transaction amount based on the quantity of electrical charging power delivered to the electric vehicle.

3. A vehicle charging station in accordance with claim 2, wherein said vehicle charging station is further configured to deduct the transaction amount from the determined present balance of the account.

4. A vehicle charging station in accordance with claim 1, wherein said vehicle charging station is further configured to compare the metered quantity of electrical charging power delivered with a metered value determined by the electric vehicle.

5. A vehicle charging station in accordance with claim 1, wherein said vehicle charging station is coupled to at least one visual display, said vehicle charging station is further configured to output to the at least one display at least one of a representation of the quantity of electrical charging power delivered, a monetary value of the quantity of electrical charging power delivered, and a representation of a quantity of electrical charging power remaining to be delivered.

6. A vehicle charging system for use in charging an electric vehicle, said system comprising:
   a vehicle charging station coupled to a server system, said vehicle charging station configured to:
      communicatively couple to the electric vehicle;
      electrically couple to the electric vehicle via a connector;
      receive a unique identifier from the electric vehicle, wherein the unique identifier is associated with a preferred provider;
      transmit the unique identifier to said server system;
      receive, from said server system, a determination of the preferred provider associated with the unique identifier;
      receive, from said server system, a determination of an account associated with the unique identifier;
      determine a present balance of the account based on the unique identifier;
      deliver a quantity of electrical charging power to the electric vehicle via the connector from a roaming third party provider that is different than the preferred provider when the determined present balance of the account meets or exceeds a predetermined amount;
      when the determined present balance of the account does not meet the predetermined amount:
         deny access to electrical charging power;
         increase the determined present balance of the account to meet the predetermined amount; and deliver the quantity of electrical charging power to the electric vehicle via the connector from the roaming third party provider that is different than the preferred provider; and meter the quantity of electrical charging power delivered to the electric vehicle; and said server system configured to:

determine the preferred provider based on the unique identifier;

determine the account associated with the preferred provider and with the unique identifier; and determine a transaction amount based on the quantity of electrical charging power delivered to the electric vehicle by said vehicle charging station.

7. A system in accordance with claim 6, wherein said server system comprises a database and a computer coupled to said database, said computer is configured to:

access said database;

search for the unique identifier in said database;

determine the preferred provider based on the search results; and determine the account based on the search results.

8. A system in accordance with claim 6, wherein said vehicle charging station comprises a meter configured to determine the quantity of electrical charging power delivered to the electric vehicle.

9. A system in accordance with claim 8, wherein said meter is further configured to transmit the quantity of electrical charging power delivered to said server system, and said server system is configured to forward the quantity to the preferred provider when a provider of the quantity of electrical charging power is different than the preferred provider.

10. A system in accordance with claim 9, wherein said server system is configured to determine the transaction amount based on the quantity of electrical charging power delivered.

11. A system in accordance with claim 6, wherein said server system is configured to deduct the transaction amount from the account.

12. A method for charging an electric vehicle, said method comprising:

communicatively coupling a vehicle charging station to the electric vehicle;

electrically coupling the vehicle charging station to the electric vehicle via a connector;

receiving a unique identifier from the electric vehicle, wherein the unique identifier is associated with a preferred provider;

determining, by a processor, the preferred provider for the electric vehicle based on the unique identifier;

determining, by the processor, an account associated with the preferred provider and the unique identifier;

determining, by the processor, a present balance of the account based on the unique identifier;

delivering a quantity of electrical charging power to the electric vehicle via the connector from a roaming third party provider that is different than the preferred provider when the determined present balance of the account meets or exceeds a predetermined amount;

when the determined present balance of the account does not meet the predetermined amount:

denying access to electrical charging power;

increasing the determined present balance of the account to meet the predetermined amount; and delivering the quantity of electrical charging power to the electric vehicle via the connector from the roaming third party provider that is different than the preferred provider; and metering the quantity of electrical charging power delivered to the electric vehicle; and determining a transaction amount based on the quantity of electrical charging power delivered to the electric vehicle at the vehicle charging station.

13. A method in accordance with claim 12, wherein determining an account comprises:

accessing a database;

searching for the unique identifier in the database;

determining the preferred provider based on the search results; and determining the account based on the search results.

14. A method in accordance with claim 13, wherein determining the preferred provider and the account further comprises transmitting the unique identifier from the vehicle charging station to a server coupled to the database and the server transmitting the unique identifier to the preferred provider when a provider of the quantity of electrical charging power is different than the preferred provider.

15. A method in accordance with claim 12, further comprising deducting the transaction amount from the account.

* * * * *